July 12, 1927.
R. C. BOTSFORD
TRENCH SPADE
Filed Aug. 10, 1926
1,635,308
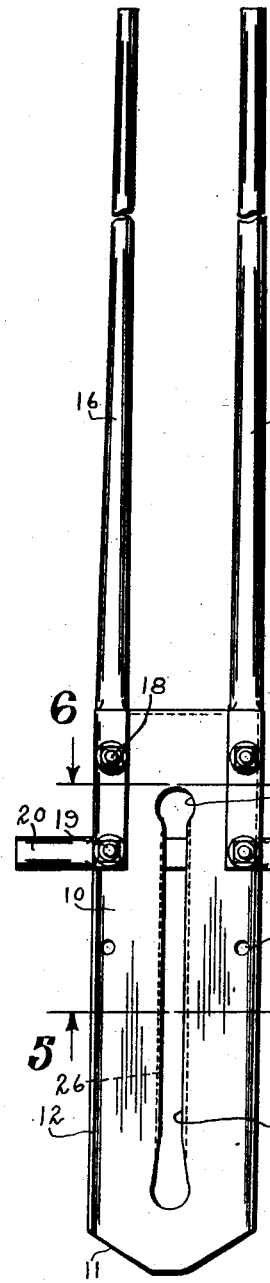
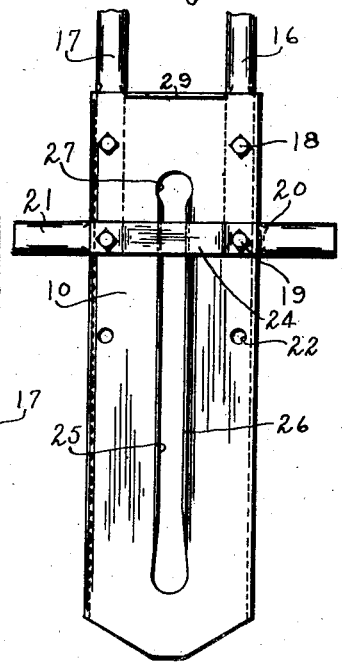
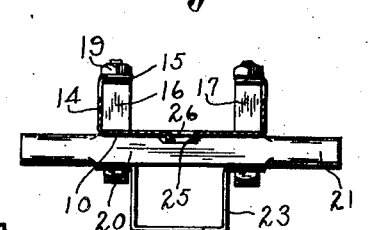
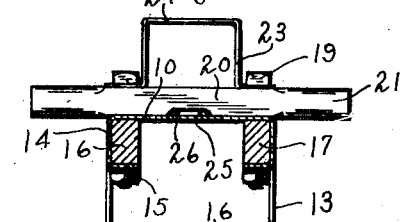
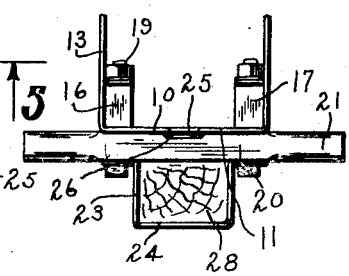
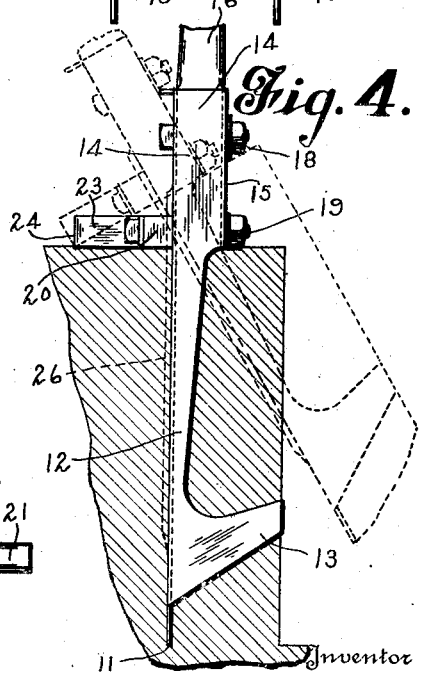
Inventor
Robert C. Botsford
By Henry E. Rockwell
Attorney Patented July 12, 1927.

1,635,308

UNITED STATES PATENT OFFICE.

ROBERT C. BOTSFORD, OF EAST HAVEN, CONNECTICUT.

TRENCH SPADE.

Application filed August 10, 1926. Serial No. 128,457.

This invention relates to implements for digging purposes and more especially to the forms of such implements generally known as spades or shovels. More particularly the invention relates to a spade for use in digging ditches in peat or bog lands, and contemplates the provision of such a device especially adapted for operation by manual power, and particularly designed for use by one man.

Peat, bog or salt meadow lands being more or less of a fibrous constituency, due to grass, roots, etc., are especially difficult to dig into and a special form of spade or shovel has been found necessary. Such a device, while being strong and rigid should also be light in weight and readily operable by one man. Due to the constituency of the land above referred to, considerable suction is developed, after inserting the spade into the same, while attempting to elevate the spade full of material from the ditch or other excavation, and this suction should be as nearly as possible eliminated.

One of the objects of this invention is to provide an improved spade or shovel for use in excavating in lands of the above described nature.

Another object of this invention is to provide a spade for the above or similar use, that will be especially efficient in use, economical to manufacture, light in weight, and strong and rigid in structure.

Still another object of this invention is to provide a spade for the above or similar use, wherein means is provided to relative a maximum amount of the suction developed while digging.

To these and other ends this invention consists in the novel features and combinations thereof to be hereinafter described and claimed.

In the accompanying drawings:

Fig. 1 is a front view of a spade embodying the features of this invention;

Fig. 2 is a rear view of the blade portion and adjacent cooperating parts thereof;

Fig. 3 is a bottom end view of the same;

Fig. 4 is a side view of the same, shown inserted into a section of land and by dotted lines being shown tilted into a position to remove a quantity of land from the excavation;

Fig. 5 is a section on line 5—5 of Fig. 1, and

Fig. 6 is a section on line 6—6 of Fig. 1.

The device selected to illustrate the features of my invention is a spade or shovel adapted for the digging of trenches of a desired width in bog, peat or land of similar constituency. This spade has a blade 10, preferably formed from sheet metal, and is provided with a lower edge 11, suitably formed for cutting into the land. Flanges 12 are provided which extend forwardly from the outer surface of the blade at the side edges thereof, and at substantially right angles thereto. The flange 12 is suitably formed to provide a side cutting member 13 of the necessary height to sever a desired quantity of land at the sides of the blade and to form a straight sided ditch or other excavation. Above the side cutting member 13 the flange extends upwardly along the edge of the blade to strengthen the same, and merges into a channel shaped handle securing portion of the blade forming the side 14 thereof. The material forming the side portions 14 is bent inwardly over the blade a short distance as at 15. The upper edge of the blade is provided with a rearwardly directed flange 29 and formed integrally therewith. The flange 29 is disposed transversely of the blade and forms a transverse reinforcement therefor.

A pair of handles 16 and 17 are secured to the blade by means of bolts 18 and 19. The handles are spaced apart, each being disposed at one side of the blade between the portion 15 and the blade 10 within the channel shaped portion and against the inside surface of the side portion 14. The bolts 18 and 19 pass through the portion 15, the handle 16 or 17 and the blade 10. The lower bolts 19, in this instance, also extend through a bar 20 which is disposed transversely across the rear surface of the blade and secures the same thereto.

The bar 20 is positioned above the bottom edge 11 of the blade 10, the desired distance, to limit the amount the blade 10 is inserted into the land, abutting the upper surface of the same when the blade is inserted therein. Side extensions 21 provided on the bar permit the user to force the blade into the land by foot pressure. Openings 22 are provided in the blade 10 below and spaced from the openings for the bolts 19 so that the bar 20 may be lowered relatively to the edge 11 and secured to the blade by other bolts, to vary the depth of the excavation.

A fulcrum member is provided and comprises the bent rod 23, which is secured to the blade 10 by the same securing means that retains the bar 20 thereon. The member 23 extends rearwardly and is provided with a rearwardly disposed portion 24 which forms a fulcrum means whereby the blade 10 is swung forwardly away from the land as well as lifted therefrom when the spade is operated to remove a portion of land from an excavation. It may be desirable to provide a block of wood or an extension from the bar 20 to fill up the space between the bar 20 and the portion 24 of the rod 23 as indicated at 28 in Fig. 3, to prevent the portion 24 sinking into the land when the same is soft.

The blade 10 is provided with a vent opening 25, which is in the form of an elongated slot extending longitudinally of the blade substantially in the center thereof. The material at the side edges of the opening 25 is raised from the surface of the blade (in this instance, the rear surface) 10 to form ribs 26, which act as reinforcing ribs for the blade 10 to strengthen it longitudinally. The opening 25 extends upwardly from a point adjacent the edge 11 to a point above the bar 20 so as to insure that the upper end of the opening 27 will always be above the upper surface of the land.

In operation the spade is thrust into the land by the user who may then press, with his foot, upon the side extensions 21 until the bar 20 rests upon the upper surface of the land. A portion of land is thus severed from the remainder by the edge 11 and the side cutting member 13. The ribs while also entering the land tend to loosen the same about the opening 25, thus allowing air to enter the land from above through the upper end 27 and downwardly to the rear of the blade 10 and closely adjacent the lower edge 11 thereof. By tilting the blade forwardly by pulling the handles 16 and 17 rearwardly, using the member 23 as a fulcrum when it rests upon the land at the portion 24, the released portion of the land may be readily removed from the excavation.

While I have shown and described a preferred embodiment of my invention, it is to be understood that the same is not to be limited thereto in all of its details, as modifications and variations thereof are possible which will lie within the spirit of the invention and the scope of the appended claims.

What I claim is:—

1. In a spade of the type described, handle means, a blade secured thereto and operable thereby, means secured to said blade to limit the effective length thereof, said blade having a slot substantially in the center and extending longitudinally thereof from a point adjacent one end to a point beyond said limiting means, the material of said blade along the edges of the slot being flared outwardly to provide blade reinforcing ribs.

2. A blade for a spade, comprising a sheet metal structure having a body portion with a flange extending longitudinally along each side thereof, means extending transversely across and disposed intermediate the ends of said body portion to limit the amount said blade may be inserted into the ground, said blade having a slot formed in the body thereof extending longitudinally therein and above said limiting means to provide an opening at the rear of said blade to permit the entrance of air into the ground in back of the same, the material of said body portion being flared rearwardly along the edges of the slot to provide reinforcing ribs.

3. A spade of the type described, comprising a blade having an operating handle secured thereto, said blade having a bar extending transversely across and intermediate the ends of the same and a rearwardly extending fulcrum member secured to said bar.

4. In a spade of the type described, the combination of a blade having a slot extending longitudinally the greater part of the length thereof, a transversely extending bar secured to said blade intermediate the ends of the slot therein, and an operating handle therefor.

5. In a spade of the type described, the combination of a blade having a slot extending longitudinally the greater part of the length thereof, a transversely extending bar secured to said blade intermediate the ends of the slot therein, a rearwardly extending fulcrum member secured to said bar and a handle extending upwardly from said blade.

6. In a spade of the type described, the combination of a blade having a slot extending longitudinally the greater part of the length thereof, a transversely extending bar secured to said blade intermediate the ends of the slot therein, said bar having end portions thereon extending beyond the sides of said blades.

7. A blade for a spade, comprising a body portion having a flange along each side thereof, means extending transversely across and disposed intermediate the ends of said blade to limit the effective length thereof, said blade having a slot formed in the body portion thereof, and extending longitudinally therein above and below said means.

8. In a spade of the type described, a blade having a body portion, a handle secured to said body portion, said body portion being provided with a longitudinally extending series of equally spaced apart perforations, said handle being provided with a longitudinally extending series of equally spaced apart perforations, there being more perforations in one part than in the other, securing means adapted to pass through said perforations, the spacing of said perforations in said blade and said handle being substantially equal, whereby said handle is securable to said blade in a variety of positions by the use of different combinations of the perforations in these parts.

9. In a spade of the type described, a blade having a body portion, a handle secured thereto, a transversely extending cross bar secured to said body portion intermediate the ends of said blade, said body portion being provided with a longitudinally extending series of equally spaced apart perforations, securing means adapted to pass through certain of said perforations and through corresponding perforations in said cross bar to secure the two parts together with the cross bar spaced from the lower end of said blade a predetermined amount, said means being removable and adapted to pass through the perforations in said bar and others of said perforations in said blade to secure said cross bar to said blade in other positions, whereby the effective length of said blade will be varied.

In witness whereof, I have hereunto set my hand this 6th day of August, 1926, at New Haven, State of Connecticut.

ROBERT C. BOTSFORD.